United States Patent
Griffin

[11] 3,732,774
[45] May 15, 1973

[54] AUTOMATIC RELOADING APPARATUS AND SHOTGUN SHELL DRIVE MEANS THEREFOR

[76] Inventor: Tommy K. Griffin, 539 Hidden Valley Drive, Houston, Tex. 77037

[22] Filed: May 5, 1971

[21] Appl. No.: 140,486

[52] U.S. Cl....................................................86/23
[51] Int. Cl..............................................F42b 33/02
[58] Field of Search....................86/23–32, 39, 41; 100/43, 48, 53

[56] References Cited
UNITED STATES PATENTS 3,483,792  12/1969  Williams................................86/27
3,157,086  11/1964  Bachhuber..............................86/27
3,336,829   8/1967  Lee........................................86/23

Primary Examiner—Benjamin A. Borchelt
Assistant Examiner—Harold Tudor
Attorney—Carl B. Fox, Jr.

[57] ABSTRACT

Automatic shotgun shell reloading apparatus and drive means therefor, wherein a shell reloading apparatus having plural sequential reloading stages is driven by operation of an electric motor one-half rotation at a time to give up and down movements to the operating lever of the shell reloading apparatus.

4 Claims, 1 Drawing Figure

PATENTED MAY 15 1973
3,732,774
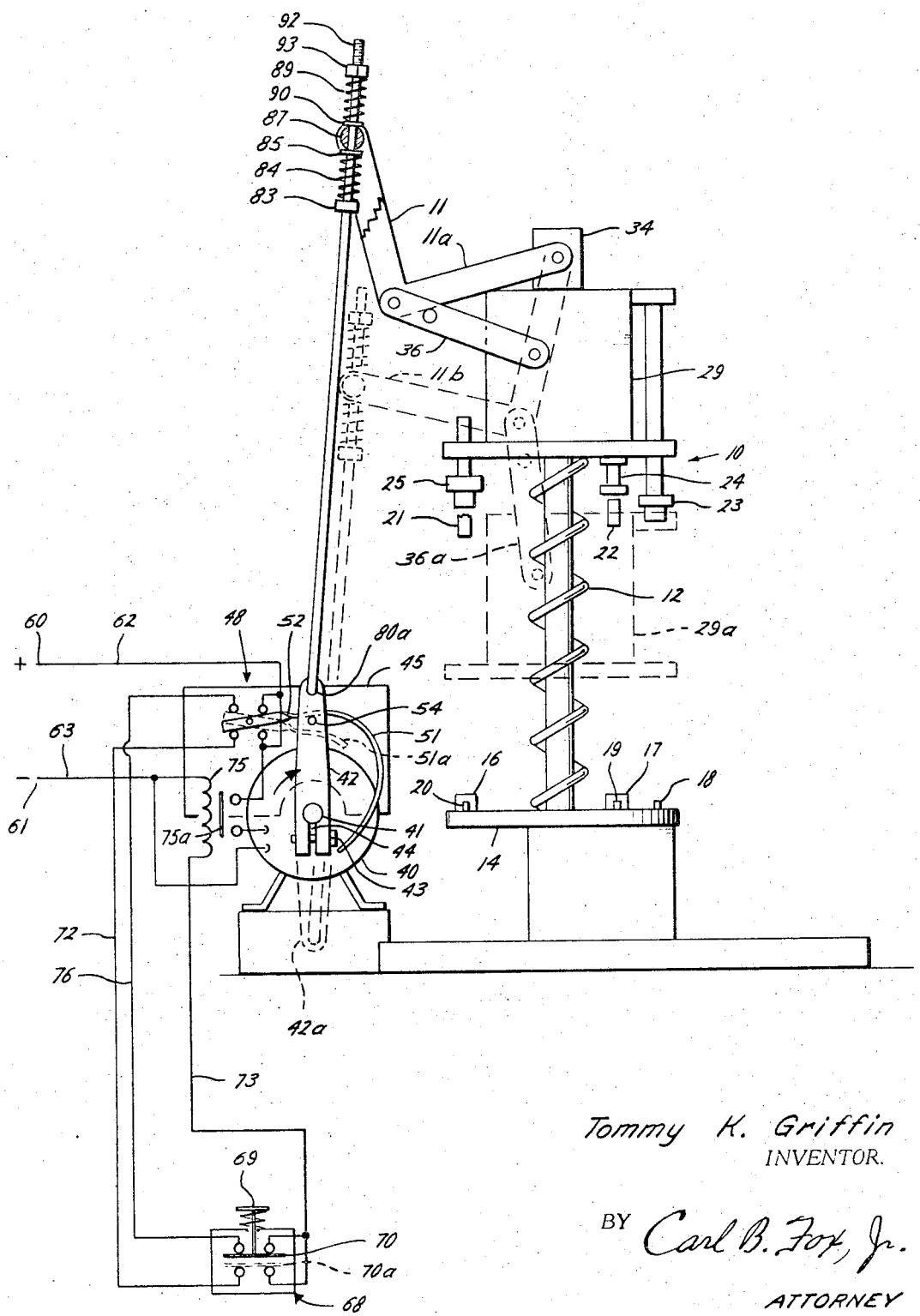
Tommy K. Griffin
INVENTOR.
BY Carl B. Fox, Jr.
ATTORNEY

AUTOMATIC RELOADING APPARATUS AND SHOTGUN SHELL DRIVE MEANS THEREFOR

SUMMARY OF THE INVENTION

In shotgun shell reloading apparatus for home and small shop use, the apparatuses are conventionally operated by hand, by moving an actuating lever or handle downwardly and upwardly to sequentially perform each of a series of steps required for reloading of a shell. The stages or steps of reloading of shotgun shells may differ from apparatus to apparatus, not only in the number of stages required for reloading of a shell, but also in the accomodations of the stages into groups. A rod connected to the operating lever or handle of the shell reloading apparatus is connected to a circularly rotatable arm carried on the shaft of an electric drive motor. The electric drive motor is controlled to rotate one-half rotation at a time by a novelly arranged microswitch having a curved contact which is engaged by a contact on the rotating arm over 180° of movement, the rotating arm being moved over the length of the curved contact for its downward stroke or movement, and then moved through the other half of a circle between the ends of the contact for the upward stroke or movement. A control switch is preferably actuated by a foot of the user, the pressure of the control switch causing downward half circle rotation of the rotating arm and release of the control switch causing upward half-circle movement of the rotating arm. At the top of the stroke, the pivotal arm does not move further until such time as the control switch is again depressed. The upward and downward rotating arm movements cause upward and downward movements of the lever or the crank of the shell reloading apparatus to cause it to operate at each of its sequential reloading stages. An empty shotgun shell casing is moved sequentially to a plurality of stages of the shell reloading apparatus to complete the reloading. For example, the following steps or stages of shell reloading may be provided in the apparatus: First, the old primer is punched off of the shell casing and the shell casing is resized; at a second stage, a new primer is inserted into the head of the shell casing; in the third stage, powder, wad and shot are placed into the shell casing; in the fourth stage, a crimp of the shell casing end is started; and in the fifth and final stage the crimp of the end of the shell casing is completed. As has been stated, the steps and step combinations may be altered somewhat from one type of shell reloading machine to another, but all such machines are operated by providing reloading steps or stages and each stage is operated by a downward pull and return upward of a crank or handle.

An advantage of use of shell reloading apparatus having an automatic drive as herein disclosed is that the stages are operated more rapidly and in addition are operated more uniformly. With hand cranking of the apparatus, differing speeds and pressures are applied which make the reloading of shells somewhat nonuniform. Using the apparatus as herein described, each stage of each cycle of operation of the shell reloading apparatus is the same as others, and the reloaded shells are entirely uniform and of consistant performance. Each shell is passed through the plural stages or steps, and the same pressure and timing of the operating tools is obtained for each stroke, so that extreme uniformity of the shells and consistency of performance thereof is achieved.

Other objects and advantages of the invention will appear from the following detailed description of a preferred embodiment of apparatus, reference during the description being made to the accompanying drawing.

BRIEF DESCRIPTIONS OF THE DRAWING

The drawing is a side elevational view of a preferred embodiment of apparatus according to the invention, and includes a schematic electrical circuit showing for the apparatus.

DESCRIPTION OF THE PREFERRED EMBODIMENT

Referring now to the drawing in detail, a standard commercial shell reloading apparatus is referred to by reference numeral 10. Such apparatuses, from make to make, will vary as to design and structure, but all machines of this type function in generally the same manner and are operated by pulling down on an operating crank or lever 11, which is then returned upwardly by hand or by a compression spring 12. Apparatus 10 is shown schematically in the drawing, and the exact form of apparatus 10 is not intended to limit the invention.

Apparatus 10 has five operating stages which work on a shell casing as it is moved to each stage sequentially during reloading, the stages or steps being used in sequence for each shell to be reloaded. Apparatus 10 has five such stages, but the number of stages in other machines may be different than five. The shell casing is placed at circularly spaced plural locations upon a base plate 14, the location being indicated by reference numerals 16–20, stages 16, 17 being behind stages 20, 19, respectively, as shown in the drawing. The five tools 21–25 are disposed directly vertically above the five locations or stations 16–20, respectively. When the operating head 29 of the apparatus is moved downwardly to position 29a, the tools apprach their respective stations on base plate 14, and a reloading step is performed on a shell at each location (or locations) at which a shell casing is located. For example, tool 21 above shell position 16 may be a punch for removing a used primer from the head of a shell casing and for resizing of the shell casing; tool 22 above position 17 may be a repriming stage wherein a new prime is inserted into the head of the shell casing; tool 23 above position 18 may be a tool for reloading the shell with powder, and wherein a new wad and shot are placed within the shell casing; tool 24 above reloading position 19 may be a tool to commence crimping of the upper end of the shell casing; and tool 25 above position 20 may be a tool for completing the crimp started by tool 24.

Head 29 receives therethrough a shaft 32 about which spring 12 is helically disposed. Shaft 32 has at its upper end a stationary fitting 34 to which crank handle 11 is pivotally connected. Crank 11 is angular as shown in the drawing, the portion 11a being nearly horizontal when the handle is in "up" position and being moved downwardly to a nearly vertical position when the handle is moved down. A link 36 is pivotally pinned to handle 11 at the bend thereof, the inner lower end of link 36 being pivotally connected to operating head 29. When handle 11 is pulled down link 36 moves downward angularly to a more nearly vertical position and forces operating head 29 downwardly against the upward bias of spring 12. When handle 11 is raised to its "up" position, the operating head is returned upwardly. The downwardly moved positions of the handle 11 and link 36 are indicated by dashed line positions 11b, 36a in the drawing.

An electric motor 40 has a shaft 41 through which a rotating arm 42 is secured at one of its ends by tightening screw 43 disposed across shaped slot 44. A plate 45 mounted on the end of motor 40 carries a microswitch 48. The contact arm 51 of the microswitch is flat and elongated and resilient, and is twisted at 52 so that its flat surfaces are disposed inwardly and outwardly, and is curved downwardly to extend increasingly close to shaft 41, as shown. Rotating arm 42 has a laterally extending contact pin 54 which is in contact with the inner surface of contact arm 51 as rotating arm 42 is rotated 180°, a half circle, by motor 40. In other words, pin 54 contacts the underside of contact arm 51 on clockwise rotation from the position of arm 42 shown in the drawing for one-half circle to the dashed line position 42a disposed downwardly. During the other half circle of rotation of arm 42, the pin 54 is not in contact with contact arm 51.

Motor 40 may be, for example, a Von Wies brake gear-motor, model VW8, 30rpm, 1/10 horse power, shaded-pole motor. Other equivalent motors or other motors having similar operating characteristics may be employed in place of the motor 40 specifically described.

Referring now to the electrical circuit for use in connection with the apparatus, an electrical power source indicated by terminals 60, 61 is connected by conductors 62, 63. Switch 48 is a two position switch, the contact arm 51 being pivotally moved from its normal position 51a to its pivotally moved position 51 by movement by pin 54 of rotating arm 42. Pin 54 contacts the upper part of contact 51 and slides downwardly around to the right to its downward position along the length of contact 51, thereby forcing contact 51 outwardly. A floor switch 68 having operating actuator 69 is a two position switch, the upper normally closed position 70 being indicated in the drawings. Upon depression of actuator 69 the contact is moved to position 70a.

For the downstroke movement of arm 42, commencing with arm 42 upward as shown by solid lines in the drawing and with pin 54 in contact with the underside of contact arm 51, depression of footswitch actuator 69 causes electrical current flow through conductor 62, arm 51 (in its position 51) conductor 72, the footswitch contact in position 70a, conductor 73, solenoid coil 75, and conductor 63, to close the solenoid switch 75a to cause motor 40 to operate. When pin 54 leaves the lower end of contact arm 51 the motor is shut off. Upon release of footswitch actuator 69, motor 40 is again energized to operate, to move arm 42 in its upstroke movement, through conductor 62, arm 51 in position 51a, conductor 76, the footswitch contact in position 70, conductor 73, solenoid coil 75, and conductor 63. When pin 54 again contacts contact arm 51, motor 40 is shut off.

It will be perceived that the handle 11 of apparatus 10 is pulled downwardly by connecting rod 80 when motor 40 is operating with pin 54 in contact with contact 51. It will also be clear that the connecting rod 80 will be moved upwardly when motor 40 is operating with pin 54 out of contact with contact 51. Therefore, according to the electrical circuit shown in the drawing, motor 41 operates to move rotating arm 42 around to the right from its upward position to its downward position when actuator 69 is depressed, and operates to move rotating arm 42 around to the left and upward to its upright position when actuator 69 is released. Then the motor does not operate again until such time as actuator 69 is again depressed.

Connecting rod 80 is bent to L-shape at its lower end, the end being passed through an opening in rotating arm 42, the bent end of rod 80 being indicated by reference numeral 80a. At its upper end, a collar 83 is fixed to connecting rod 80, there being a helical compression spring 84 above collar 83. A slidable washer 85 is disposed above spring 84. A connector pin 87 is laterally drilled to receive rod 80 therethrough, an end of pin 87 being pivotally connected through an opening through handle 11. A helical compression spring 89 is disposed above a slidable washer 90, and the upper end of rod 80 is threaded at 92 and nut 93 is screwed thereon. Screwing nut 93 downwardly tightens the compressions of the springs 84, 89 while turning of nut 93 upwardly decreases the spring tensions. Therefore, pin 87 engaged with handle 11 provides a cushioned connection which may be adjusted so that the extent and force of downward and upward movement of the handle may be accomplished. This connection may be eliminated from the apparatus herein disclosed if desired; however, its provision provides that the operation of the shell reloading apparatus may be adjustable and prevent shock and strain on the shell reloading apparatus.

In summary, a shell is reloaded by moving the shell casing through positions 16–20, whereupon each of the tools 21–25 acts thereon, in sequence, to reload the shell. The shell casing is moved manually from one position to another of positions 16–20. However, a rotating base 14 may be provided which will sequentially rotate to the five different positions if such is desired. All that is necessary to reload a shotgun shell is to move the shell casing first to position 16, in which position the foot actuator 69 is pressed downwardly and then released. This causes rod 80 to move first downwardly and then upwardly to operate handle 11 downwardly and then upwardly. This cycle of handle operation is performed at each of the five reloading stations, until the shell becomes fully reloaded and ready for use. If desired, a plurality of shell casings may be moved one after the other to the five positions so that five shell casings may be worked upon at each operation of the actuator. Usually, however, since with this actuator such little time and effort is required to reload a shell it is generally preferred that one shell at a time be passed through the apparatus.

Pistol and rifle cartridges and generally all types of shells and cartridges may be reloaded using the apparatus.

While Preferred embodiments of the apparatus have been described and shown in the drawing, many modifications thereof may be made by a person skilled in the arts without departing from the spirit of the invention, and it is intended to protect by Letters Patent all forms of the invention falling within the scope of the following claims:

I claim:

1. Apparatus for operating a shell reloader of the type having an operating handle which is pulled downwardly and then returned upwardly to cause performance of a single reloading step of a series of reloading steps, the shell being moved to a different position for each reloading step, comprising an electric drive motor, an arm extending outwardly from the shaft of said drive motor, link means connected at one end to an outward point of said arm and connected at the other end to said operating handle whereby a first half-rotation of said drive motor pulls said operating handle downwardly and a second half-rotation of said drive motor returns said operating handle upwardly, and control means for operating said drive motor to rotate stepwise by a first half-rotation and then a second half-rotation to operate said shell reloader through one reloading step of said series of reloading steps.

2. The combination of claim 1, said control means comprising first electrical contact means carried by said arm, second electrical contact arm means arcuately disposed for contact by said first electrical contact means through one-half rotation of said arm and motor.

3. The combination of claim 2, including electrical switch means for controlling rotations of said drive motor, said drive motor being operated to rotate said first half-rotation when said switch means is depressed and said drive motor being operated to rotate said second half-rotation when said switch means is released, whereby depression and release of said switch means causes performance of one reloading step of said series of reloading steps.

4. The combination of claim 1, the connection of said link means to said operating handle being spring cushioned whereby shock to said reloader is eliminated.

* * * * *